United States Patent
Raich et al.

(10) Patent No.: US 7,271,118 B2
(45) Date of Patent: Sep. 18, 2007

(54) XYLENES ISOMERIZATION CATALYST SYSTEM AND USE THEREOF

(75) Inventors: Brenda A. Raich, Annandale, NJ (US); Robert A. Crane, Hellertown, PA (US); Christine N. Elia, Bridgewater, NJ (US); Teresa A. Jurgens-Kowal, Seabrook, TX (US); Gary D. Mohr, Houston, TX (US); David L. Stern, Asbury, NJ (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 236 days.

(21) Appl. No.: 10/902,322

(22) Filed: Jul. 29, 2004

(65) Prior Publication Data

US 2006/0030478 A1 Feb. 9, 2006

(51) Int. Cl.
*B01J 29/06* (2006.01)
*B01J 29/068* (2006.01)

(52) U.S. Cl. ............................. 502/66; 502/64; 502/67; 502/69; 502/71

(58) Field of Classification Search ................. 502/64, 502/66, 67, 69, 71
See application file for complete search history.

(56) References Cited

U.S. PATENT DOCUMENTS

| | | | |
|---|---|---|---|
| 3,354,078 A | 11/1967 | Miale et al. | |
| 4,117,026 A | 9/1978 | Haag et al. | |
| 4,159,282 A | 6/1979 | Olson et al. | |
| RE31,919 E | 6/1985 | Butter et al. | |
| 4,899,011 A | 2/1990 | Chu et al. | |
| 5,476,823 A | 12/1995 | Beck et al. | |
| 5,516,956 A | 5/1996 | Abichandani et al. | |
| 5,689,027 A | 11/1997 | Abichandani et al. | |
| 5,705,726 A | 1/1998 | Abichandani et al. | |
| 6,028,238 A | 2/2000 | Beck et al. | |
| 6,198,013 B1 | 3/2001 | Mohr et al. | |
| 6,245,704 B1 * | 6/2001 | Benazzi et al. | 502/74 |
| 6,504,074 B2 * | 1/2003 | Verduijn et al. | 585/475 |
| 6,576,581 B1 * | 6/2003 | Sharma et al. | 502/66 |
| 6,958,305 B2 * | 10/2005 | Verduijn et al. | 502/67 |
| 2002/0115555 A1 * | 8/2002 | van den Berge et al. | 502/61 |
| 2004/0029716 A1 * | 2/2004 | Mohr et al. | 502/67 |

FOREIGN PATENT DOCUMENTS

WO  WO 02/45851 A1  6/2002
WO  WO 2006/022991 A1  3/2006

OTHER PUBLICATIONS

Poole, Charles P. Jr., *An Electron Spin Resonance Study of Coke Deposits on a Silica-Alumina Catalyst*, Journal of Catalysis, vol. 4, 1965, p. 518-522, no month.
Miale, J.N., "*Catalysis by Crystalline Aluminosilicates*," Journal of Catalysis, vol. 6, p. 278-287, 1966, no month.
Olson, D.H., "*Chemical and Physical Properties of the ZSM-5 Substitutional Series*," Journal of Catalysis, vol. 61, p. 390-396, (1980), no month.
U.S. Appl. No. 10/309,634, filed Dec. 4, 2002, Buchanan et al.

* cited by examiner

*Primary Examiner*—Elizabeth D. Wood
(74) *Attorney, Agent, or Firm*—Michael Kerns; Xiabing Feng

(57) ABSTRACT

A catalyst system that exhibits a ratio of ethylene saturation to aromatics ring saturation of greater than 3,500. The catalyst system comprises two components and each component comprises a crystalline molecular sieve having a Constraint Index of from about 1 to about 12 and an effective amount of Group VIII metal. The catalyst system finds particular application in ethylbenzene conversion/xylenes isomerization reactions. The catalyst system can be prepared by incorporating the Group VIII metal into the molecular sieves by competitive ion exchange.

35 Claims, 1 Drawing Sheet

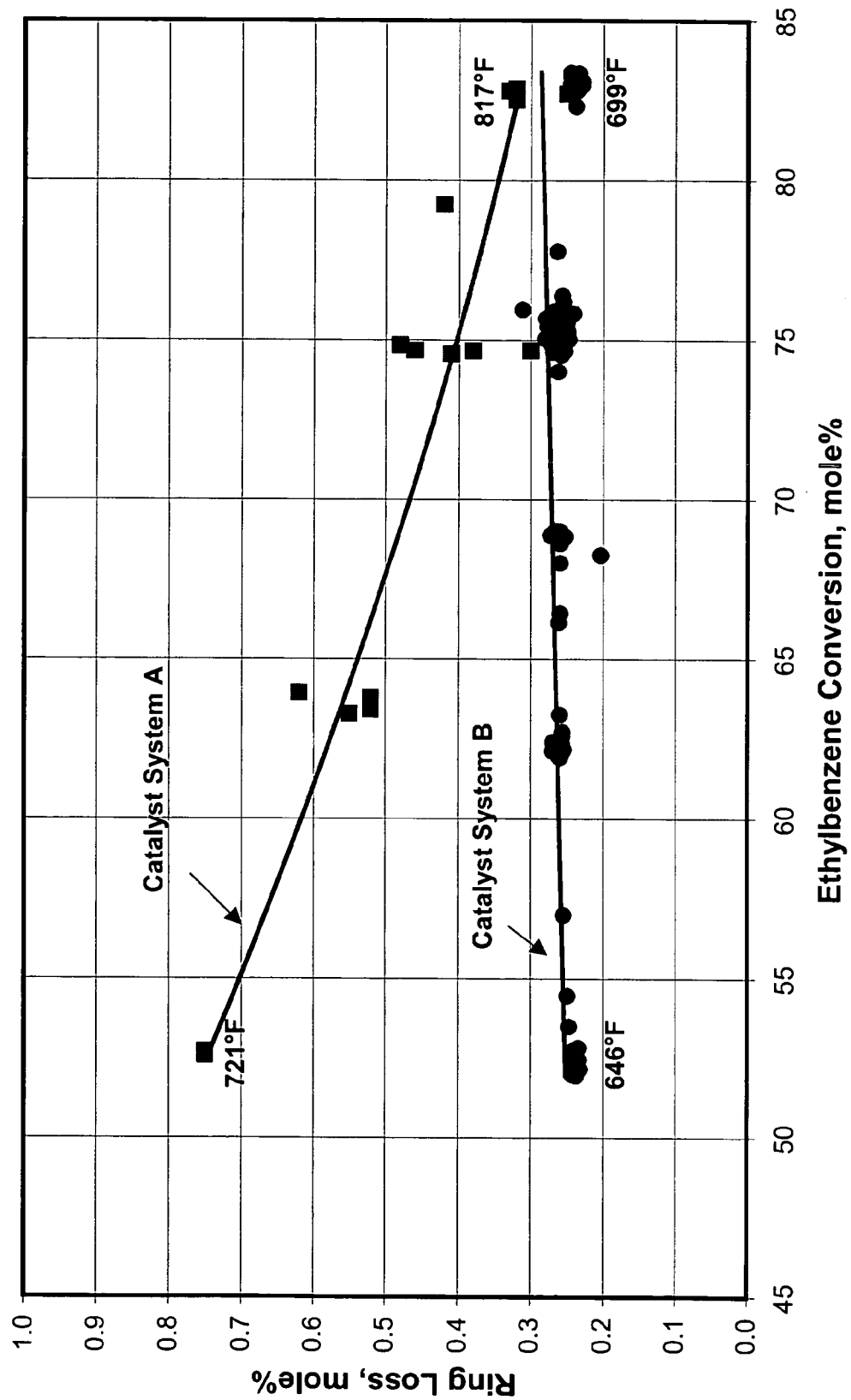
FIGURE

XYLENES ISOMERIZATION CATALYST SYSTEM AND USE THEREOF

FIELD OF THE INVENTION

This invention relates to a catalyst system that exhibits high ethylene saturation activity in conjunction with low aromatic ring saturation. This invention also relates to a process for the isomerization of xylenes and conversion of ethylbenzene using the catalyst system.

BACKGROUND OF THE INVENTION

Para-xylene is a valuable chemical feedstock, which may be derived from mixtures of $C_8$ aromatics separated from such raw materials as petroleum naphthas, particularly reformates, usually by selective solvent extraction. The $C_8$ aromatic fractions from these sources vary quite widely in composition but will usually comprise 10 to 32 wt % ethylbenzene with the balance, xylenes, being divided between approximately 50 wt % of the meta isomer and 25 wt. % each of the para and ortho isomers.

Individual isomer products may be separated from the naturally occurring mixtures by appropriate physical methods. Ethylbenzene may be separated by fractional distillation, although this is a costly operation. Ortho-xylene may be separated by fractional distillation, and is so produced commercially. Para-xylene may be separated from the mixed isomers by fractional crystallization, selective adsorption (e.g., the Parex process), or membrane separation.

As commercial use of para-xylene has increased, combining physical separation with chemical isomerization of the other xylene isomers to increase the yield of the desired para-isomer has become increasingly important. However, since the boiling point of ethylbenzene is very close to those of para-xylene and meta-xylene, complete removal of ethylbenzene from the $C_8$ aromatic feed by distillation is impractical. Hence an important feature of any commercial xylene isomerization process is the ability to convert ethylbenzene in the feed to useful by-products while simultaneously minimizing any conversion of xylenes to other compounds.

One commercially successful xylene isomerization process is described in U.S. Pat. No. 4,899,011 in which a $C_8$ aromatic feed, which has been depleted in its para-xylene content, is contacted with a two component catalyst system. The first catalyst component selectively converts the ethylbenzene by deethylation to form benzene and ethylene which is converted to ethane, while the second component selectively isomerizes the xylenes to increase the para-xylene content to a value at or approaching the thermal equilibrium value. The first catalyst component comprises a zeolite having a Constraint Index from 1 to 12, which has an ortho-xylene sorption time of greater than 50 minutes based on its capacity to sorb 30% of the equilibrium capacity of ortho-xylene at 120° C. and an ortho-xylene partial pressure of 4.5±0.8 mm of mercury, whereas the second component comprises a Constraint Index 1-12 zeolite which has an ortho-xylene sorption time of less than 10 minutes under the same conditions. In one preferred embodiment, the first catalyst component is ZSM-5 having a crystal size of at least 1 micron and the second catalyst component is ZSM-5 having a crystal size of 0.02-0.05 micron. Each catalyst component also contains a hydrogenation metal.

An improvement over the process of U.S. Pat. No. 4,899,011 is described in U.S. Pat. No. 5,689,027 in which the first catalyst component in the two component system is pre-selectivated by coking, or more preferably by deposition of a surface coating of silica, to increase its ortho-xylene sorption time to greater than 1200 minutes under the same test conditions as cited in the '011 patent. Using such a system it is found that high ethylbenzene conversion rates can be achieved with significantly lower xylene losses than obtained with the process of the '011 patent. Again, the catalyst components employed in the process of the '027 patent include a hydrogenation metal.

One method of producing the noble metal-containing zeolite catalysts employed in the processes of the '011 patent and the '027 patent is disclosed in U.S. Pat. Reissue No. 31,919 and involves incorporating the noble metal in cationic form with the zeolite after crystallization of the zeolite, but before final catalyst particle formation and before any calcination or steaming of the zeolite. Where the noble metal is platinum, the Examples in the '919 patent demonstrate improved ethylbenzene conversion with relatively low xylene loss.

Despite recent advances reported above, there remains an ongoing need to provide a catalyst for ethylbenzene conversion/xylenes isomerization that achieves even lower xylene losses. Thus, for example, although platinum-containing catalysts are effective for ethylene saturation, they also catalyze aromatic ring saturation. Further, aromatic ring saturation is thermodynamically enhanced at low temperatures, and this typically requires pre-sulfiding of the catalyst or operation at elevated temperature, even though the latter produces adverse effects on product slates and/or cycle lengths.

SUMMARY OF THE INVENTION

In accordance with the present invention, there is provided a catalyst system that exhibits a ratio of ethylene saturation to aromatics ring saturation of greater than 3,500. The catalyst system comprises two components. Each component comprises a crystalline molecular sieve having a Constraint Index of from about 1 to about 12 and an effective amount of Group VIII metal.

Preferably, the catalyst system exhibits a ratio of ethylene saturation to aromatics ring saturation of greater than 10,000, more preferably greater than 20,000, and even more preferably greater than 25,000, and most preferably greater than 30,000.

In another embodiment, there is provided a process for producing the two component catalyst system by incorporating Group VIII metal cations into the molecular sieves by competitive ion exchange. The process is carried out by contacting the molecular sieves with an aqueous solution containing non-hydrogenation metal cations, e.g., ammonium cations, and Group VIII metal cations, e.g., platinum cations, under conditions effective for ion exchanging the Group VIII metal cations into the molecular sieves. The mole ratio of non-hydrogenation metal cations to Group VIII metal cations in the aqueous solution is in the range of from about 500 to about 6000.

In a further embodiment, the present invention provides a process for isomerizing a feed which contains ethylbenzene and xylenes. The process is carried out by contacting the feed under effective conditions with a catalyst system that exhibits a ratio of ethylene saturation to aromatics ring saturation of greater than 10,000, said process comprising:

(a) contacting the feed in the presence of hydrogen and under ethylbenzene conversion conditions with a first component containing a crystalline molecular sieve having a Constraint Index of from about 1 to about 12 and an effective amount of a Group VIII metal; and (b) contacting the ethylbenzene-depleted effluent of step (a) under xylene isomerization conditions with a crystalline molecular sieve having a Constraint Index of from about 1 to about 12 and an effective amount of a Group VIII metal.

BRIEF DESCRIPTION OF THE DRAWING

The FIGURE is a graph of ethylbenzene conversion in mole percent plotted against aromatics ring loss in mole percent for the catalyst systems of Example 4.

DETAILED DESCRIPTION OF THE INVENTION

As used herein, the ratio of ethylene saturation to aromatics ring saturation for the catalyst system is determined by the following formula:

Weight ratio of ethane to ethylene/Percent by mole of xylenes ring-loss

The values set forth in the above formula are determined at the temperature of 650° F. (343° C.), a weight hourly space velocity of 10, a hydrogen/hydrocarbon mole ratio of 1, and a pressure of 225 psig (1551 Pa) total pressure. The feed used is a $C_8$ aromatic feed consisting of 13.0 weight percent ethylbenzene, 1.0 weight percent of para-xylene, 67.0 weight percent of meta-xylene and 19.0 weight percent of ortho-xylene.

Feedstock

In general, any aromatic $C_8$ mixture containing ethylbenzene and xylene may be used as feed to the process of this invention. Generally, such a mixture will typically have an ethylbenzene content in the approximate range of 5 to 60 weight percent, an ortho-xylene content in the approximate range of 0 to 35 weight percent, a meta-xylene content in the approximate range of 20 to 95 weight percent and a para-xylene range of about 0 to 15 weight percent. The feed in addition to the above aromatic $C_8$ mixture may contain non-aromatic hydrocarbons, i.e., naphthenes and paraffins, in an amount up to about 30 weight percent. In a preferred embodiment, the invention provides means to process a mixture of $C_8$ aromatics such as that derived from catalytic reforming of a petroleum naphtha to a mixture of reduced ethylbenzene content and increased content of para-xylene. The invention is particularly effective in treating a para-xylene lean mixture of $C_8$ aromatics to increase the para-xylene concentration up to approximately the thermal equilibrium level.

The process of the present invention is especially suitable for the isomerization of $C_8$ aromatic streams that contain about 2 to 60 wt. % ethylbenzene, e.g., about 4 to 20 wt. % ethylbenzene. This range spans the range of ethylbenzene concentrations of streams that are derived from a reformer and a pyrolysis gasoline unit. The present catalyst may have high activity for cracking of normal and branched paraffins of the type present in unextracted $C_8$ aromatic streams.

Catalyst System

The catalyst system comprises a first component which has a primary function of converting ethylbenzene, such as by selectively deethylating the ethylbenzene in the feedstream and converting ethylene produced by the deethylation to ethane, and a second component to selectively isomerize xylenes in the feed. The first catalyst component comprises a crystalline molecular sieve having a Constraint Index of from about 1 to about 12 and an effective amount of Group VIII metal. The first component will usually also effect some isomerization of the xylenes in the feed. The second component comprises a crystalline molecular sieve having a Constraint Index of from about 1 to about 12 and an effective amount of Group VIII metal.

The first component of the catalyst system is usually upstream with respect to the second component which is effective to isomerize the xylene components of the $C_8$ aromatic feed. In this embodiment, the first component is employed in a volume sufficient to achieve the desired level of ethylbenzene conversion, generally a volume greater than about 5 percent, e.g., greater than 10 percent, e.g., greater than 25 percent, e.g., greater than 50 percent, e.g., greater than 55 percent, e.g., greater than 60 percent, e.g., greater than 75 percent, e.g., greater than 80 percent, of the volume of the total catalyst system.

Examples of molecular sieves that can be used in the first and second components includes large pore molecular sieves and intermediate pore size molecular sieves. These molecular sieves are described in "Atlas of Zeolite Framework Types", eds. Ch. Baerlocher, W. H. Meier, and D. H. Olson, Elsevier, Fifth Edition, 2001, which is hereby incorporated by reference. Large pore molecular sieves generally have a pore size greater than about 7 Å. Examples of suitable large pore molecular sieves include AEL, MOR, and *BEA structure types. Examples of specific large pore molecular sieves, include Beta and mordenite. Intermediate pore size molecular sieves generally have a pore size from about 5 Å to about 7 Å. Examples of suitable intermediate pore size molecular sieves include those having AEL, MFI, MEL, MTW, MWW, TON, MTT, FER and MFS structure types (IUPAC Commission on Zeolite Nomenclature). Preferred molecular sieves are aluminosilicate forms having a silica to alumina molar ratio of at least 12. Examples of specific intermediate pore size molecular sieves, include SAPO-11, MCM-22 family of molecular sieves, e.g., MCM-22, MCM-49, and MCM-56, ZSM-5, ZSM-11 ZSM-12, ZSM-22, ZSM-23, ZSM-34, ZSM-35, ZSM-48, and ZSM-57.

The molecular sieve of each of the first and second components is associated with a Group VIII metal. The Group VIII metals include platinum, palladium, iridium, ruthenium, rhodium, osmium, nickel, cobalt, and iron. The Group VIII metal associated with the molecular sieves will usually be a noble metal. The noble metals are platinum, palladium, iridium, ruthenium, rhodium, osmium. Preferably, platinum is associated with the molecular sieves. Reference to Group VIII metal or metals is intended to encompass such metal or metals in the elemental state (i.e. zero valent) or in some other catalytically active form such as an oxide, sulfide, halide, carboxylate and the like. It is to be appreciated that the Group VIII metal is not necessarily present on the component in the free metal (i.e., zero valent) form, but can also be present as a compound, such as an oxide, hydroxide or sulfide, of the metal. The Group VIII metal is preferably in a reduced valence state, e.g., when this component is in the form of an oxide or hydroxide. The reduced valence state of the Group VIII metal may be attained, in situ, during the course of a reaction, when a reducing agent, such as hydrogen, is included in the feed to the reaction.

The Group VIII metal will usually be incorporated into the first and second components by competitive ion exchange. Competitive ion exchange achieves good axial distribution of the Group VIII metal in the molecular sieve.

Although the invention is not intended to be limited to any theory of operation, it is believed that the advantages of high ethylene saturation activity in conjunction with low aromatic ring saturation of the catalyst system are obtained because most of the Group VIII metal particles are finely dispersed within the pores of the molecular sieve. When the Group VIII metal particles are inside the pores of the molecular sieve, aromatics saturation can not occur because of transition state selectivity, i.e., the reaction transition state of saturated aromatics is too large to form within the pores of the molecular sieve. Still further, it is believed that the high dispersion of the Group VIII metal particles keeps aromatics from being in contact with more than one Group VIII metal atom. Regardless of the theory proposed the process has the improved properties disclosed therein.

Competitive ion exchange involves utilizing non-hydrogenation metal cations to compete with the Group VIII metal cations for exchangeable cations in the molecular sieve. Competitive ion exchange can be carried out by contacting the molecular sieves of the first and second components with an aqueous loading solution containing predetermined amounts of Group VIII metal cations, e.g., platinum cations, and predetermined amounts of non-hydrogenation metal cations, e.g., ammonium cations.

The ratio of non-hydrogenation metal cations to Group VIII cations in the loading solution will vary on a number of factors including the pH of the loading solution, the inherent acidity of the component, and the amount of Group VIII metal to be associated with the molecular sieve. The loading solution is usually formulated such that it has a mole ratio of non-hydrogenation metal cations to Group VIII cations in the range of from about 500 to 6000. Preferably, mole ratio of non-hydrogenation metal cations to Group VIII cations is in the range of from about 700 to 2000. More preferably, mole ratio of non-hydrogenation metal cations to Group VIII cations is in the range of from about 900 to 1100. The amount of non-hydrogenation metal cations and Group VIII cations present in the loading solution depends on the desired amount of Group VIII metal to be contained in the finished catalyst.

Usually the pH of the loading solution is maintained between 4 and 10. When molecular sieve of the top bed component (component effective for ethylbenzene conversion) is selectivated with silica, the pH of the aqueous loading solution is usually maintained at a pH no greater than 7, preferably in the range of from about 6.5 to no greater than 7. The adjustment of the pH of the loading solution during the loading process is usually accomplished using an aqueous solution containing ammonium hydroxide.

Examples of Group VIII metal cations for the loading solution include chloroplatinic acid, platinum chloride and tetraammineplatinum and tetraamminepalladium complexes, such as tetraammineplatinum(II) nitrate, and pentaamminechloroiridium (III) chloride. Examples of suitable non-hydrogenation metal cations for the loading solution include halides or nitrate of ammonium. After incorporation of the metal, the catalyst is usually rinsed with water, dried, and calcined.

Examples of non-hydrogenation metal cations for the loading solution include ammonium cations.

The amount of the Group VIII metal present in the first and second catalyst components can vary, e.g., 0.001 to about 10 percent by weight based on the weight of the catalyst component.

With respect to the first catalyst component, the Group VIII metal will preferably be present in an amount in the range from about 0.001 to about 0.05 percent by weight, and, more preferably, from about 0.01 to about 0.04 percent by weight, although this will, of course, vary with the nature of the metal. Where the Group VIII metal is platinum, the amount of Group VII metal present in the first catalyst component is preferably about 0.03 percent by weight of the overall catalyst component.

With respect to the second catalyst component, the Group VIII metal will preferably be present in an amount in the range from about 0.001 to about 0.03 percent by weight, e.g., from about 0.0075 to about 0.02 percent by weight, although this will, of course, vary with the nature of the component. Where the Group VIII metal is platinum, the amount present in the second catalyst component is preferably about 0.01 percent by weight of the overall catalyst component.

In practicing the process of the invention, it may be desirable to formulate either or both of the first and second catalyst components with another material resistant to the temperature and other conditions of the process. Such matrix materials include inorganic oxide materials such as clays, silica, and/or metal oxides. The metal oxides may be naturally occurring or in the form of gelatinous precipitates or gels including mixtures of silica and metal oxides. Naturally occurring clays which can be composited with the molecular sieve include those of the montmorillonite and kaolin families, which families include the subbentonites and the kaolins commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the molecular sieves employed herein may be composited with a porous matrix material, such as alumina, silica-alumina, silica-magnesia, silica-zirconia, silica-thoria, silica-berylia, silica-titania, as well as ternary compounds such as silica-alumina-thoria, silica-alumina-zirconia, silica-alumina-magnesia, and silica-magnesia-zirconia. A mixture of these components can also be used. In addition, the molecular sieve can be composited with a zeolitic matrix material using the method described in U. S. Pat. No. 6,198,013, the entire contents of which are incorporated herein by reference. Preferably, the binder is silica.

The relative proportions of molecular sieve component and inorganic oxide matrix on an anhydrous basis may vary widely with the molecular sieve content ranging from between about 1 to about 99 percent by weight and more usually in the range of about 10 to about 80 percent by weight of the dry composite.

The first and second components of the catalyst system of the invention will usually differ from each other in a number of significant aspects which ensure that first component selectively deethylates the ethylbenzene in the feedstream to benzene while the second component selectively isomerizes xylenes in the feed. These differing characteristics are discussed below.

For example, each of the components of the catalyst system of the invention will normally exhibit mutually exclusive xylene diffusional properties. These properties can be identified by noting the time (in minutes) required to sorb 30% of the equilibrium capacity of ortho-xylene at 120° C. and at an ortho-xylene partial pressure of 4.5±0.8 mm of mercury, a test described in U.S. Pat. Nos. 4,117,026; 4,159,282; and Re. 31,782; each of which is incorporated by reference herein. The equilibrium capacity of ortho-xylene is defined herein as greater than 1 gram of xylene(s) per 100 grams of molecular sieve. In the catalyst system of the invention, the first catalyst component effective for ethylbenzene conversion preferably has an ortho-xylene sorption time (in minutes) in excess of about 50 and preferably greater than about 1200, but less than 10,000 minutes, while on the other hand, the second, isomerization component preferably has an ortho-xylene sorption time of less than about 50 minutes and preferably less than about 10 minutes.

Ethylbenzene Conversion Component

The ethylbenzene conversion component preferably has an ortho-xylene sorption time in excess of about 50 minutes and preferably greater than about 1200, but less than 10,000, minutes. The desired xylene diffusion properties can be achieved in a number of ways. For ortho-xylene diffusion times at or near the minimum value of 50 minutes, the selection of a large crystal form of the molecular sieve used in the catalyst, that is having an average crystal size in excess of 1 micron, may be sufficient. However, to achieve higher diffusivity values, it may be desirable to selectivate the first component by deposition on the surface of the catalyst particles of a layer of coke and/or an oxide, such as silica, which is inert under the process conditions experienced in use. Where the component particles are selectivated, both large crystal size and medium crystal size molecular sieves can be used in the first component.

The molecular sieve of the first component preferably has a higher acid activity than the molecular sieve of the second catalyst. Preferably, the molecular sieve of the first catalyst component preferably has an alpha value that is at least twice the alpha value as the second component. The second component usually has an alpha value of at least 30. An procedure for measuring alpha value described in U.S. Pat. No. 3,354,078; in the *Journal of Catalysis*, Vol. 4, p. 527 (1965); Vol. 6, p. 278 (1966); and Vol. 61, p. 395 (1980), each incorporated herein by reference as to that description. The experimental conditions of the test used herein include a constant temperature of 538° C. and a variable flow rate as described in detail in the *Journal of Catalysis*, Vol. 61, p. 395. The higher alpha values correspond with a more active cracking catalyst.

Preferably the first component is not steamed. When steaming is used to lower the alpha value of the first component to the values described above, the steaming is typically achieved by heating the first component at a temperature of from about 100° C. to about 600° C., e.g., from about 175° C. to about 325° C., in an atmosphere containing from about 1% to about 100% steam, e.g., from about 50% to about 100% steam, at a pressure of from about 0.01 psia to about 50 psia (70Pa to 345 kPa), for a duration of about 0.1 to about twenty-four hours, e.g., from about three to about six hours.

Where the first component is to be selectivated with silica, this is conveniently achieved by subjecting the catalyst to one or more treatments with an organosilicon compound in a liquid carrier, each treatment being followed by calcination of the treated material in an oxygen-containing atmosphere, e.g., air. Such a multiple selectivation procedure is described in U.S. Pat. No. 5,476,823, the entire contents of which are incorporated herein by reference. Preferably, the first component is subjected to two to four silica selectivation treatments. Where the catalyst to be silica-selectivated includes a binder, it is preferable to employ a non-acidic binder, such as silica.

The organosilicon compound, which is used to selectivate the first catalyst component may, for example, be a silicone, a siloxane, a silane or mixture thereof. These organosilicon compounds may have at least 2 silicon atoms per molecule. These organosilicon compounds may be solids in pure form, provided that they are soluble or otherwise convertible to the liquid form upon combination with the liquid carrier medium. The molecular weight of the silicone, siloxane or silane compound employed as a preselectivating agent may be between about 80 and about 20,000, and preferably within the approximate range of 150 to 10,000. Representative preselectivation silicone compounds include dimethyl silicone, diethyl silicone, phenylmethyl silicone, methylhydrogen silicone, ethylhydrogen silicone, phenylhydrogen silicone, methylethyl silicone, phenylethyl silicone, diphenyl silicone, methyltrifluoropropyl silicone, ethyltrifluoropropyl silicone, polydimethyl silicone, tetrachlorophenylmethyl silicone, tetrachlorophenylethyl silicone, tetrachlorophenylhydrogen silicone, tetrachlorophenylphenyl silicone, methylvinyl silicone, and ethylvinyl silicone. The preselectivating silicone, siloxane or silane compound need not be linear, but may be cyclic, for example, hexamethyl cyclotrisiloxane, octamethyl cyclotetrasiloxane, hexaphenyl cyclotrisiloxane and octaphenyl cyclotetra-siloxane. Mixtures of these compounds may also be used as preselectivating agents, as may silicones with other functional groups.

Preferably, the kinetic diameter of the organosilicon compound, that is used to preselectivate the molecular sieve, is larger than the molecular sieve pore diameter, in order to avoid entry of the organosilicon compound into the molecular sieve pores and any concomitant reduction in the internal activity of the molecular sieve.

Preferred organosilicon preselectivating agents, particularly when the preselectivating agent is dissolved in an organic carrier or emulsified in an aqueous carrier, include dimethylphenyl methyl polysiloxane (e.g., Dow-550) and phenylmethyl polysiloxane (e.g., Dow-710). Dow-550 and Dow-710 are available from Dow Chemical Co., Midland, Mich.

Preferably, the liquid carrier for the organosilicon compound is an organic compound, such as a linear, branched or cyclic hydrocarbon having five or more, especially 7 or more, carbon atoms per molecule, e.g., an alkane, such as heptane, octane, nonane or undecane. The boiling point of the organic compound, e.g., alkane, may be greater than about 70° C. Mixtures of low volatility organic compounds, such as hydrocracker recycle oil, may be employed as carriers. Particularly preferred organic carriers are decane and dodecane.

Following each impregnation with the organosilicon compound, the catalyst is calcined at a rate of from about 0.2° C./minute to about 5° C./minute to a temperature greater than 200° C., but below the temperature at which the crystallinity of the molecular sieve is adversely affected. This calcination temperature will generally be below 600° C. and preferably is within the approximate range of 350 to 550° C. The duration of calcination at the calcination temperature may be from 1 to 24 hours, e.g., from 2 to 6 hours. Preferably, the catalyst is exposed to three selectivation sequences.

In addition to, or in place of, silica selectivation, the first catalyst component may be subjected to coke selectivation. This optional coke selectivation typically involves contacting the catalyst with a thermally decomposable organic compound at an elevated temperature in excess of the decomposition temperature of said compound but below the temperature at which the crystallinity of the molecular sieve is adversely affected. This contact temperature may be, for example, less than about 650° C. Organic materials, which may be used for this coke selectivation process, encompass a wide variety of compounds including by way of example, hydrocarbons, such as paraffins, cycloparaffins, olefins, cycloolefins and aromatics; oxygen-containing organic compounds, such as alcohols, aldehydes, ethers, ketones and phenols; and heterocyclics, such as furans, thiophenes, pyrroles and pyridines. A hydrogen cofeed may be used to deter the excessive build-up of coke. Further details regarding coke selectivation techniques are provided in the U.S. Pat. No. 4,117,026, incorporated by reference herein. By using a combination of silica selectivation followed by coke selectivation, the number of organosilicon impregnation treatments required to achieve a particular xylene diffusivity can be reduced.

Isomerization Component

The second component of the catalyst system is effective to isomerize the xylenes of the feed containing $C_8$ aromatics. The second component preferably has an ortho-xylene sorption time of less than about 50 minutes and preferably less than about 10 minutes. This is typically achieved by using a small crystal size molecular sieve, having an average crystal size of 0.02-0.05 micron, in this component. The molecular sieve of the second component of the catalyst system will typically have an alpha value of at least about 30.

Preferably, the second molecular sieve has been steamed to achieve the desired alpha value prior to incorporation of the Group VIII metal with the molecular sieve.

Process Conditions

The conditions used in the process of the invention are not narrowly defined, but generally will include a temperature of from about 400 to about 1,000° F. (204 to 540° C.), a pressure of from about 0 to about 1,000 psig (100 to 7000 kPa), a weight hourly space velocity (WHSV) of between about 0.1 and about 200 $hr^{-1}$, and a hydrogen, $H_2$, to hydrocarbon, HC, molar ratio of between about 0.2 and about 10. Preferably, the conditions include a temperature of from about 650 to about 775° F. (343 to 413° C.), a pressure of from about 50 and about 400 psig (445 to 2860 kPa), a WHSV of between about 3 and about 50 $hr^{-1}$ and a $H_2$ to HC molar ratio of between about 0.7 and about 3.

In general, the process of the invention is carried out in a fixed bed reactor containing the catalyst system described above. In a preferred embodiment, the first and second components of the catalyst system are in sequential beds in a single reactor. That is, the component of the catalyst system used in the process of the invention, which is effective for ethylbenzene conversion, forms a first bed, while the other component of the catalyst system, which is effective for xylene isomerization, forms a second bed downstream of the first bed. The feed is preferably cascaded from the first to the second bed without intervening separation of light gases. As an alternative, the first and second beds could be disposed in separate reactors, which, if desired, could be operated at different process conditions. Additional catalyst beds may be provided prior to or after the first and second catalyst components of the invention.

After the conversion process, the isomerization product can be treated to isolate para-xylene and/or other desirable xylene(s). Thus, for example, the isomerizate product can be fed to a variety of para-xylene recovery units, such as a crystallizer, a membrane separation unit, or a selective adsorption unit, and thus the para-xylene may be isolated and recovered. The residual isomerizate can be stripped of products lighter than $C_8$. Products heavier than $C_8$ in the residual isomerizate can be further processed or may be fractionated out. $C_8$ fractions from which para-xylene has been removed can be recycled to the isomerizer.

One result of the process of this invention is to convert the mixed xylene components of the feed containing para-xylene in an amount less than that at thermal equilibrium to an extent such that product from the isomerizer contains para-xylene in an amount at least approaching that at thermal equilibrium.

Another result of the process of this invention is the conversion of a high proportion of the ethylbenzene contained in the mixed xylene feed with minimal xylene loss. For example, ethylbenzene conversion levels of greater than 50 wt % can be accomplished at xylene loss levels of less than 2 wt %.

The following Examples illustrate the invention.

EXAMPLE 1 (COMPARATIVE)

An evaluation for assessing ethylene saturation versus aromatic ring saturation was carried out using a two-component catalyst system. The two-component catalyst system contained 40 percent by weight of top bed component and 60 percent by weight of bottom bed component. Platinum was incorporated into the top bed component by incipient wetness impregnation and platinum was incorporated into the bottom bed component during mulling.

The top bed component for the two-component catalyst system was formed from ZSM-5 having a medium crystal size. The ZSM-5 was composited with a silica binder in a weight ratio of 65% by weight ZSM-5 and 35% by weight silica binder. The silica-bound ZSM-5 was extruded into 1/16" diameter cylindrical particles using conventional means and was then subjected to a multiple silica-selectivation sequence involving four successive impregnation treatments with 7.8 wt. dimethylphenylmethyl polysiloxane in decane. After each impregnation, the solvent was stripped, and the catalyst was calcined in $N_2$ and then in air to 538° C. Platinum was then incorporated onto the selectivated catalyst by incipient wetness impregnation with tetraammine platinum(II) nitrate, followed by drying and air calcination. The catalyst was then steamed to an alpha value of 158. The resulting catalyst contained 0.1 percent by weight of platinum.

The bottom bed component was formed from ZSM-5 having a small crystal size. The ZSM-5 was composited with an alumina binder in a weight ratio of 50 percent ZSM-5 and 50 percent alumina binder. The alumina-bound ZSM-5 was extruded into 1/16"diameter cylindrical particles using conventional means, with 0.1 weight percent platinum, as tetraamine platinum chloride, being added while mulling of the ZSM-5 and alumina binder material. The mulling was carried out using the techniques described in U.S. Pat. Reissue No. 31,919. The extrudate was then dried and calcined in air. The catalyst was then steamed to an alpha value of 18. The bottom bed component contained 0.1 percent by weight of platinum.

The two-component catalyst system was evaluated in the conversion of ethylbenzene in a microunit at 805° F. (429° C.), 10 WHSV, 1:1 $H_2$:HC, and 225 psi (1551 kPa) total pressure.

The feed used in the evaluation was a $C_8$ aromatic feed composed of 0.7 wt % non-aromatics, 0.6 wt % toluene, 18.7 wt % ethylbenzene, 0.6 wt % para xylene, 61.7 wt % meta xylene, 16.7 wt % orthoxylene, 1 wt % nine carbon and higher aromatic species. The catalyst was presulfided at 750° F. (399° C.) and 250 psig using 2 equivalents of sulfur per mole of platinum then de-edged at 805° F. (429° C.), 10 WHSV, 0.9:1 $H_2$:HC, and 186 psig (1282 kPa) total pressure for eleven days. The results are reported below in Table I.

TABLE I

| | |
|---|---|
| Ethylbenzene Conversion (wt %) | 78.6 |
| Aromatics Ring Loss (mol %) | 0.35 |
| Ethane:Ethylene Ratio (wt %:wt %) | 1155 |
| Ethane Saturation:Aromatics Ring Saturation Ratio | 3300 |

EXAMPLE 2 (COMPARATIVE)

A two-component catalyst system was assessed for ethylene saturation versus aromatic ring saturation. The two-component catalyst system contained 30 percent by weight of top bed component and 70 percent by weight of bottom bed component. Platinum was incorporated into the top bed component by ion exchange and platinum was incorporated into the bottom bed component by ion exchange.

The top bed component was prepared in the same manner as the top bed component of Example 1, except that the catalyst was exposed to three selectivation sequences, had an alpha value of 500, and the platinum was loaded into the selectivated catalyst by ion exchange. The ion exchange was carried out by dissolving tetraammine platinum (II) nitrate (0.030 grams of platinum) into 500 cc of water and then heating the solution to 176° F. (80° C.). Next, 100 grams of the silicon selectivated catalyst was submerged in the solution. The solution was circulated for 8 hours. The catalyst was removed from the solution, rinsed with distilled water, dried at 250° F. (121° C.), and calcined in air at 660° F. (354° C.) for 1 hour. The top bed component contained 0.03 percent by weight of platinum and had an alpha value of 500.

The bottom bed component was prepared by forming an extrudate containing 80 weight percent ZSM-5 and 20 weight percent silica binder which had been steamed to an alpha value of 108. Next, tetraammine platinum (II) nitrate (0.02 grams of platinum) was dissolved into 600 cc of distilled water and the pH of the solution was adjusted to between 8 to 9 using a solution containing 10 percent by weight of ammonium hydroxide. The platinum-containing solution was circulated over the catalyst for 3 hours. The pH of the solution was maintained during the loading within 8 to 9 using a solution containing 10 percent by weight of ammonium hydroxide. The catalyst was removed from the solution, rinsed with distilled water, dried at 250° F. (121° C.), and calcined in air at 660° F. (349° C.) for 3 hours. The bottom bed component contained 0.01 percent by weight of platinum and had an alpha value of 108.

The two-component catalyst system was evaluated in the conversion of ethylbenzene in a microunit at 709° F. (376° C.), 10 WHSV, 1:1 H$_2$:HC, and 225 psi (1551kkPa) total pressure.

The feed used in the evaluation was a C$_8$ aromatic feed composed of 0.6 wt % non-aromatics, 1.4 wt % toluene, 14.7 wt % ethylbenzene, 1.3 wt % para xylene, 62.8 wt % meta xylene, 18.8 wt % orthoxylene, 0.4 wt % nine carbon and higher aromatic species. The catalyst was presulfided at 675° F. (357° C.) and 225 psig using 20 equivalents of sulfur per mole of platinum then de-edged at 750° F. (399° C.), 10 WHSV, 0.6:1 H$_2$:HC, and 198 psig (1365 kPa) total pressure for six days. The results of the test are reported below in Table II.

TABLE II

| | |
|---|---|
| Ethylbenzene Conversion (wt %) | 74.6 |
| Aromatics Ring Loss (mol %) | 0.36 |

TABLE II-continued

| | |
|---|---|
| Ethane:Ethylene Ratio (wt %:wt %) | 1547 |
| Ethane Saturation:Aromatics Ring Saturation Ratio | 4300 |

EXAMPLE 3

A two-component catalyst system was assessed for ethylene saturation versus aromatic ring saturation. The two-component catalyst system contained 30 percent by weight of top bed (first) component and 70 percent by weight of bottom bed (second) component. Platinum was incorporated into both the top bed component and bottom bed component by competitive ion exchange.

The top bed component was prepared in the same manner as the top bed component of Example 2, except that the platinum was loaded into the selectivated catalyst by competitive ion exchange. The amount of platinum incorporated into the catalyst was 0.03 percent by weight. The competitive ion exchange was carried out by first charging 250 grams of the top bed component into a 300 cc column. The catalyst was humidified by passing wet air through the column. Next, a solution containing 0.05N ammonium nitrate was circulated through the column and the pH of the solution was adjusted to between 6.5 to 7.0 using a solution containing 10 weight percent by weight of ammonium hydroxide. A solution of tetraammine platinum(II) nitrate (0.075 grams of platinum dissolved in 250 cc of distilled water) was added to the ammonium nitrate reservoir over a period of 4 hours. The mole ratio of ammonium nitrate to platinum in the platinum exchange solution was 976. The platinum exchange solution was circulated through the catalyst bed for a period of about 48 hours during which time the pH was continually maintained at a pH between 6.5 to 7.0 using a solution containing 10 weight percent by weight of ammonium hydroxide. The catalyst was rinsed with distilled water, dried at 250° F. (121° C.), and calcined in air at 660° F. (349° C.) for 3 hours. The top bed component contained 0.03 percent by weight of platinum.

The bottom bed component was prepared in the same manner as the bottom bed of Example 2 except that the platinum was incorporated into the catalyst by competitive ion exchange. The amount of platinum loaded was 0.01 weight percent. The competitive ion exchange was carried out by first charging 1298 grams of the bottom bed component into a one liter column, after which the component was humidified by passing wet air through the column. Next, 3894 cc of a 0.05N ammonium nitrate solution was circulated through the column and the pH of the solution was maintained to between 8 to 9 using a solution containing 10 weight percent by weight of ammonium hydroxide. A solution of tetraammine platinum(II) nitrate (0.13 grams of platinum dissolved in 250 cc of distilled water) was added to the ammonium nitrate reservoir over a period of 4 hours. The mole ratio of ammonium nitrate to platinum was 2921. The platinum exchange solution was circulated over the component for about 12 hours during which time the pH was continually adjusted using a solution containing 10 weight percent by weight of ammonium hydroxide. The component was rinsed with distilled water, dried at 250° F. (121° C.), and calcined in air at 660° F. (349° C.) for 3 hours. The bottom bed component contained 0.01 percent by weight of platinum.

The two-component catalyst system was evaluated in the conversion of ethylbenzene in a microunit at 675° F. (357° C.), 10 WHSV, 1:1 $H_2$:HC, and 225 psi (1551 kPa) total pressure.

The feed used in the evaluation was a $C_8$ aromatic feed composed of 0.7 wt % non-aromatics, 1.4 wt % toluene, 14.6 wt % ethylbenzene, 1.3 wt % para xylene, 63.1 wt % meta xylene, 18.8 wt % orthoxylene, 0.1 wt % nine carbon and higher aromatic species. The catalyst was presulfided at 6759F (357° C.) and 225 psig using 20 equivalents of sulfur per mole of platinum then de-edged at 775° F. (413° C.), 10 WHSV, 1:1 $H_2$:HC, and 225 psi (1551 kPa) total pressure for three days. The results are reported below in Table III.

TABLE III

| | |
|---|---|
| Ethylbenzene Conversion (wt %) | 74.9 |
| Aromatics Ring Loss (mol %) | 0.27 |
| Ethane:Ethylene Ratio (wt %:wt %) | 9793 |
| Ethane Saturation:Aromatics Ring Saturation Ratio | 36270 |

The results in Table III show that the catalyst exhibited excellent ethylbenzene conversion with high ethylene saturation in conjunction with low aromatics ring loss.

EXAMPLE 4

Catalyst System A and Catalyst System B were evaluated for ethylbenzene conversion and aromatics ring loss.

Catalyst System A was identical to the catalyst system of Example 1, except it contained 50 percent by weight of top bed and 50 percent by weight of bottom bed. Catalyst System A was run under conditions of 10 WHSV, 1:1 $H_2$:HC, and 225 psi (1551 kPa) total pressure and a temperature range from 721° F. (381° C.) to 817° F. (436° C.). The feed used in the test was a $C_8$ aromatic feed comprised of 10.3 weight percent ethylbenzene, 1.2 weight percent of para-xylene, 61.8 weight percent of meta-xylene and 26.7 weight percent of ortho-xylene.

The top and bottom beds of Catalyst System B was prepared in the same manner as Example 3 except it contained 25 percent by weight of top bed and 75 percent by weight of bottom bed. Catalyst System B was run under conditions of 10 WHSV, 1:1 $H_2$:HC, and 225 psi (1551 kPa) total pressure and a temperature range from 646° F. (341° C.) to 699° F. (371° C.). Prior to conducting the tests, Catalyst System B was de-edged at conditions of 760° F. (404° C.)10 WHSV, 1:1 $H_2$:HC, and 225 psi (1551 kPa) total pressure for two days. The feed used in the test was a $C_8$ aromatic feed comprised of 0.3 weight percent non-aromatics, 0.4 weight percent toluene, 12.9 weight percent ethylbenzene, 1.2 weight percent of para-xylene, 66.5 weight percent of meta-xylene, 18.4 weight percent of ortho-xylene and, 0.3 weight percent nine carbon and higher aromatic species.

The results of the tests are shown in the FIGURE.

The results in the FIGURE show that Catalyst System B had low aromatics ring loss at low conversion temperatures.

What is claimed is:

1. A two component catalyst system catalyst which exhibits a ratio of ethylene saturation to aromatics ring saturation of greater than 10,000, said system comprising:
   (a) a first component present in an amount of at least 5 percent by volume of said catalyst system and effective for converting ethylbenzene and comprising a first molecular sieve having a Constraint Index of about 1 to about 12 and an effective amount of a Group VIII metal; and,
   (b) a second component effective for isomerizing xylenes and comprising a second molecular sieve having a Constraint Index of about 1 to about 12 and an effective amount of a Group VIII metal, wherein said first component has an alpha value that is at least twice the alpha value of the second component, and wherein said first component and said second component are selected to effectively achieve a ratio of ethylene saturation to aromatics ring saturation of greater than 10.000 and an xylene loss level of less than 2 wt %.

2. The catalyst system recited in claim 1, wherein said first molecular sieve and said second molecular sieve have an intermediate pore size.

3. The catalyst system recited in claim 2, wherein said Group VIII metal is incorporated into said first component by competitive ion exchange.

4. The catalyst system recited in claim 3, wherein said first component or both said first component and said second component comprise a non-alumina binder.

5. The catalyst system recited in claim 4, wherein said binder is silica.

6. The catalyst system recited in claim 4, wherein said catalyst system exhibits a ratio of ethylene saturation to aromatics ring saturation of greater than 10,000.

7. The catalyst system recited in claim 2, wherein said first component is present in an amount of at least 10 percent by volume of said catalyst system.

8. The catalyst system recited in claim 1, wherein said first molecular sieve has a large pore.

9. The catalyst system recited in claim 3, wherein said Group VIII metal present in said first component and said second components is platinum.

10. The catalyst system recited in claim 9, wherein the amount of said a Group VIII metal present in said first component is an amount in the range of from about 0.01 to about 0.04 percent by weight based on the weight of said first component.

11. The catalyst system recited in claim 10, wherein the amount of said a Group VIII metal present in said second component is an amount in the range of from about 0.0075 to about 0.02 percent by Weight based on the weight of said second component.

12. The catalyst system recited in claim 11, wherein said Group VIII metal is incorporated into said first component and said second component by competitive ion exchange.

13. The catalyst recited in claim 1, wherein said first molecular sieve and said second molecular sieve are selected from the group consisting of mordenite, Beta, the MCM-22 family of molecular sieves, ZSM-5, ZSM-11, ZSM-12, ZSM-22, ZSM-23, ZSM-34, ZSM-35, ZSM-48, and ZSM-57.

14. The catalyst system recited in claim 12, wherein said catalyst system exhibits a ratio of ethylene saturation to aromatics ring saturation of greater than 20,000.

15. The catalyst system recited in claim 1, wherein said second component has an alpha value of at least about 30.

16. The catalyst system recited in claim 12, wherein said first component is modified by being exposed to at least one selectivation sequence that comprises contacting said molecular sieve with a silicon compound to obtain a selectivated molecular sieve and subsequently calcining die selectivated molecular sieve.

17. The catalyst system recited in claim 16, wherein said first component is exposed to three selectivation sequences.

18. The catalyst system recited claim 16, wherein said Group VIII metal is incorporated into said catalyst system after completion of the selectivation sequences.

19. The catalyst system recited in claim 15, wherein said first molecular sieve and said second molecular sieve are ZSM-5.

20. The catalyst system recited in claim 19, wherein said catalyst system exhibits a ratio of ethylene saturation to aromatics ring saturation of greater than 25,000.

21. The catalyst system recited in claim 20, wherein said first component is present in an amount of at least 10 percent by volume of said catalyst system.

22. The catalyst system recited in claim 21, wherein said catalyst system exhibits a ratio of ethylene saturation to aromatics ring saturation of greater than 30,000.

23. A process for preparing the two component catalyst system recited in claim 1, said process comprising:
 (i) ion exchanging Group VII metal cations into said first molecular sieve of said first component in an amount in the range of from about 0.01 to about 0.04 percent by weight, by contacting said first molecular sieve with a first aqueous loading solution containing non-hydrogenation metal cations and Group VIII metal cations, said non-hydrogenation metal cations and said Group VIII metal cations being present in said aqueous loading solution in a mole ratio in the range of from about 500 to about 6000 under conditions effective for said Group VIII cations to ion exchange into said first molecular sieve; and,
 (ii) ion exchanging Group VIII metal cations into said second molecular sieve contained in said second component in an amount in the range of from about 0.0075 to about 0.02 percent by weight, by contacting said second molecular sieve with a second aqueous loading solution containing non-hydrogenation metal cations and Group VIII metal cations, said Don-hydrogenation metal cations and said Group VIII metal cations being present in said aqueous loading solution in a mole radon in the range of from about 500 to about 6000, under conditions effective for said Group VIII cations to ion exchange into said second molecular sieve.

24. The process recited in claim 23, wherein the pH of said first and second loading solutions is maintained below 10.

25. The process recited in claim 24, wherein said first molecular sieve and said second molecular sieve have an intermediate pore size.

26. The process recited in claim 25, wherein said first component and said second component further comprise a non-alumina binder.

27. The process recited in claim 26, wherein said binder is silica.

28. The process recited in claim 23, wherein said catalyst system exhibits a ratio of ethylene saturation to aromatics ring saturation of greater than 10,000.

29. The process recited in claim 28, wherein said first component is present in an amount of at least 10 percent by volume of said catalyst system.

30. The process recited in claim 29, wherein the first molecular sieve has been selectivated using silica and the pH of the loading solution is maintained below 7.

31. The process recited in claim 23, wherein the Group VIII metal cations are platinum cations and the non-hydrogenation metal cations are ammonium cations.

32. The process recited in claim 23, wherein said catalyst system exhibits a ratio of ethylene saturation to aromatics ring saturation of greater than 25,000.

33. The process in claim 23, wherein said catalyst system exhibits a ratio of ethylene saturation to aromatics ring saturation of greater than 30,000.

34. The process recited in claim 24, wherein said first molecular sieve and said second molecular sieve are selected from the group consisting of ZSM-5, ZSM-11, ZSM-12, ZSM-22, ZSM-23, ZSM-34, ZSM-35, ZSM-48, and ZSM-57.

35. The process recited in claim 34, wherein said first molecular sieve and said second molecular sieve are ZSM-5.

* * * * *